(12) United States Patent
Wirkowski

(10) Patent No.: US 11,053,867 B2
(45) Date of Patent: Jul. 6, 2021

(54) METHOD FOR OPERATING AN INTERNAL COMBUSTION ENGINE WITH A FUEL DETECTION

(71) Applicant: CPT Group GMBH, Hannover (DE)

(72) Inventor: Michael Wirkowski, Regensburg (DE)

(73) Assignee: Vitesco Technologies GmbH, Hannover (DE)

(*) Notice: Subject to any disclaimer, the term of this patent is extended or adjusted under 35 U.S.C. 154(b) by 220 days.

(21) Appl. No.: 16/444,226

(22) Filed: Jun. 18, 2019

(65) Prior Publication Data

US 2019/0368428 A1 Dec. 5, 2019

Related U.S. Application Data

(63) Continuation of application No. PCT/EP2017/082657, filed on Dec. 13, 2017.

(30) Foreign Application Priority Data

Dec. 19, 2016 (DE) ............ 10 2016 225 435.9

(51) Int. Cl.
  *F02D 19/06* (2006.01)
  *F02D 41/38* (2006.01)
  *F02D 19/08* (2006.01)

(52) U.S. Cl.
  CPC ........ *F02D 19/087* (2013.01); *F02D 19/0615* (2013.01); *F02D 19/0634* (2013.01);
  (Continued)

(58) Field of Classification Search
  CPC .. F02D 19/087; F02D 19/0634; F02D 19/085; F02D 19/0649; F02D 19/0652;
  (Continued)

(56) References Cited

U.S. PATENT DOCUMENTS

| 9,133,782 B1 | 9/2015 | Convisser et al. |
| 2008/0035119 A1 | 2/2008 | Marriott et al. |

(Continued)

FOREIGN PATENT DOCUMENTS

| DE | 102007052096 A1 | 5/2009 |
| DE | 102008017160 B3 | 7/2009 |

(Continued)

OTHER PUBLICATIONS

Korean Intellectual Property Office Notice of Allowance dated Sep. 29, 2020 for the counterpart Korean Patent Application No. 10-2019-7021117.

(Continued)

*Primary Examiner* — George C Jin

(57) ABSTRACT

A method for operating an internal combustion engine with detection of the fuel used for injection is described. In the method, the elasticity modulus of the fuel to be injected is determined at a first and a second injection pressure. A difference value is calculated from the difference between the two elasticity modulus values related to the pressure difference and is compared with a differentiating value. The fuel being used is detected depending on whether the difference value is above or below the differentiation value. In particular, the method is used for differentiating diesel fuel EN590 and biodiesel.

16 Claims, 1 Drawing Sheet

(52) U.S. Cl.
CPC ..... *F02D 19/0649* (2013.01); *F02D 19/0652* (2013.01); *F02D 19/085* (2013.01); *F02D 19/0636* (2013.01); *F02D 41/3827* (2013.01); *F02D 41/3836* (2013.01); *F02D 2200/0602* (2013.01); *F02D 2200/0611* (2013.01); *F02D 2200/0612* (2013.01); *F02D 2200/0618* (2013.01); *Y02T 10/30* (2013.01)

(58) Field of Classification Search
CPC ............. F02D 19/0615; F02D 19/0636; F02D 2200/0602; F02D 2200/0618; F02D 2200/0612; F02D 2200/0611; F02D 41/3836; F02D 41/3827
See application file for complete search history.

(56) References Cited

U.S. PATENT DOCUMENTS

| | | | |
|---|---|---|---|
| 2014/0034022 A1* | 2/2014 | Hu ...................... | F02D 41/3845 123/456 |
| 2017/0241367 A1* | 8/2017 | Klesse ................ | F02D 41/3845 |

FOREIGN PATENT DOCUMENTS

| | | |
|---|---|---|
| DE | 102011077404 A1 | 12/2012 |
| EP | 0651150 A2 | 5/1995 |
| JP | 2005048659 A | 2/2005 |
| JP | 2008303860 A | 12/2008 |
| JP | 2013217277 A | 10/2013 |
| KR | 20140048845 A | 4/2014 |
| KR | 20160063993 A | 6/2016 |
| WO | 2009056402 A1 | 5/2009 |

OTHER PUBLICATIONS

German Office Action dated Jul. 20, 2017 for corresponding German Patent Application No. 10 2016 225 435.9.

International Search Report and Written Opinion dated Apr. 5, 2018 from corresponding International Patent Application No. PCT/EP2017/082657.

* cited by examiner

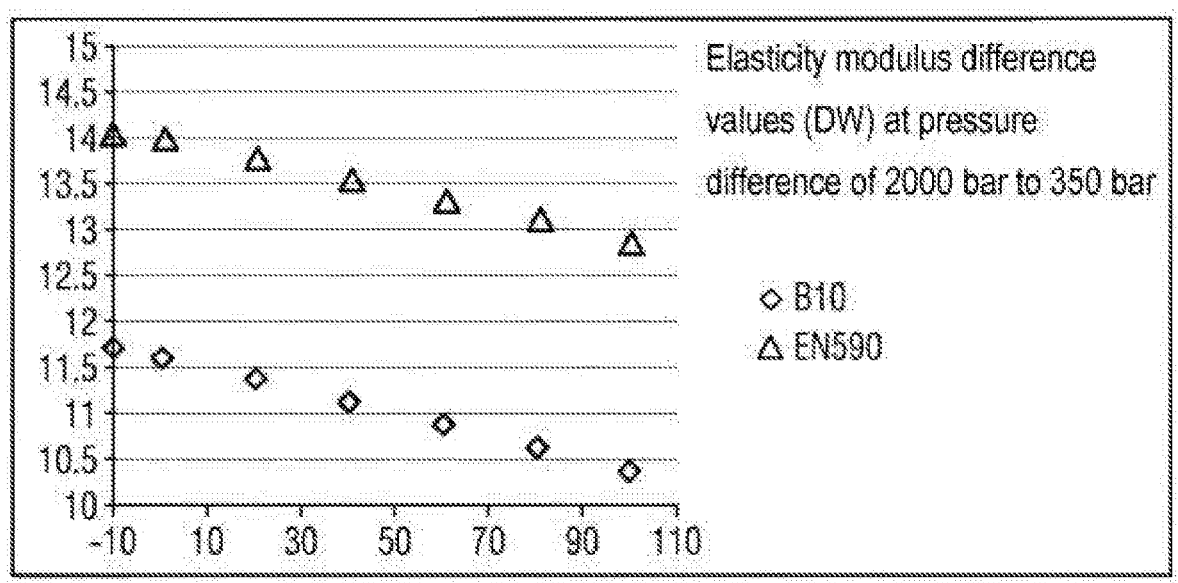

METHOD FOR OPERATING AN INTERNAL COMBUSTION ENGINE WITH A FUEL DETECTION

CROSS REFERENCE TO RELATED APPLICATIONS

This application claims the benefit of PCT Application PCT/EP2017/082657, filed Dec. 13, 2017, which claims priority to German Application DE 10 2016 225 435.9, filed Dec. 19, 2016. The disclosures of the above applications are incorporated herein by reference in their entirety.

FIELD OF INVENTION

The present invention relates to a method for operating an internal combustion engine with detection of the fuel used for injection.

BACKGROUND

In modern fuel injection systems for internal combustion engines, many parameters for the pressure control and dimensioning of the injection masses are dependent on the fuel used. In this context, the properties of the fuels, such as for example density, calorific value and compressibility, sometimes differ to a great extent. Lack of knowledge of the fuel being currently used gives rise to inaccuracies of the fuel mass injected and as result has a negative effect on the vehicle performance and, in particular, on the formation of exhaust gas.

On one hand, until now this negative effect arising from the lack of knowledge about the type of fuel has been tolerated. This then resulted in a relatively poor performance and a negative effect on the formation of exhaust gas. On the other hand, the fuel has been detected by determining its elasticity modulus (compressibility of the fuel) in conjunction with the fuel temperature. However, this requires good fuel temperature information by means of a sensor. However, such a sensor is usually not present for reasons of cost, or it is desired to omit the sensor for reasons of cost. In the fuel detection described above, the following bases are presumed: fuel is compressible. If the fuel is placed under pressure, its volume reduces and the density is increased. The ratio of the change in volume to the change in pressure is the elasticity modulus. The latter can be calculated as follows:

$$\Delta p = \frac{\Delta V}{V total} * E$$

$$E = \Delta p * \frac{V total}{\Delta V}$$

Where $\Delta p$ is the resulting difference in pressure, $\Delta V$ is the added or removed volume of fuel, Vtotal is the total hydraulic volume, and E the is the compressibility modulus.

The compressibility of different fuels differs at constant temperature. However, the compressibility of a fuel also changes with respect to the temperature. Therefore, the method described above for determining the type of fuel with a simple comparison of the elasticity modulus requires both the elasticity modulus itself and the temperature.

SUMMARY

Embodiments of the present invention are based on the object of providing a method of the type mentioned at the beginning which is distinguished by a particularly low expenditure.

Said object is achieved, in the case of a method of the specified type, by means of the following steps:
  determining the elasticity modulus of the fuel to be injected at a first injection pressure;
  determining the elasticity modulus of the fuel to be injected at a second injection pressure;
  forming the difference between the two elasticity modulus values and relating the difference to the difference in pressure in order to obtain a difference value;

$$DW = \frac{E1 - E2}{p1 - p2};$$

defining a differentiating value for the difference value; and
  detecting a first type of fuel if the difference value is above the differentiation value, and a second type of fuel if the difference value is below the differentiation value.

The method according to the embodiments has the following basis: heat is also produced when a fuel is compressed. If said seat is not carried away simultaneously, the process is not isothermic and this heat therefore generates further pressure. This adiabatic method is different with different fuels. If the difference between the elasticity modulus values is considered at two pressures, the difference is fuel-specific. As a result, fuel detection is possible without the temperature information.

Knowledge about the elasticity modulus was previously able to be used only conjunction with temperature information about the fuel detection, specifically only to the degree of precision which was allowed by the accuracy of the temperature information. In contrast, the method according to the example embodiments does not require such temperature information. The reason for this is the implementation of the isentropic gradient of the elasticity modulus plotted against pressure, which is fuel-specific.

The elasticity modulus value may be determined simply with an injection system by, for example, measuring the drop in pressure in the rail (fuel store) which occurs when a defined quantity of fuel is injected (extracted from the rail). If this is carried out at different pressures, the difference may easily be calculated from the determined elasticity modulus values. If this difference is related to the corresponding difference in pressure, a difference value is obtained which may be used to detect the fuel.

The fuel which is used or the type of fuel which is used may be detected as a function of whether the determined difference value is above or below a differentiation value. The differentiation value which is used here may be, for example, a value which is extracted from corresponding stored tables. Therefore, a value of 12.5 is defined, for example, as a differentiation value for the differentiation between diesel fuel EN590 and biodiesel. If the determined difference values are above 12.5, it is detected that the fuel which is used is diesel fuel EN590. If the difference value is below 12.5, biodiesel is detected as the fuel.

The method according to the example embodiments is preferably carried out in such a way that the first injection pressure and the second injection pressure are selected such that they are as far apart from one another as possible. A preferred pressure difference of 2000 bar to 350 bar may be given here as an example.

In addition, the method according to the invention is preferably carried out at a relatively constant initial temperature. In one particular embodiment of the method, when the initial temperature is relatively constant the difference between the elasticity modulus values is therefore determined at two pressures which are as far apart from one another as possible and related to the corresponding difference in pressure.

As already mentioned, the method according to the example embodiments is carried out, for example, in order to differentiate diesel fuel EN590 and biodiesel. The determined pressure differences are compared here with a differentiation value of 12.5 if a pressure difference of 2000 bar to 350 bar is present.

In a first method variant, the difference value during the operation of the internal combustion engine is determined on the basis of various natural operating points. In this context, an operating point with a relatively high power is selected by the driver by his driver's request. The injection pressure and the injection quantity are defined at each operating point. And therefore also at this operating point. Since both the injection quantity is known and the pressure is measured, the elasticity modulus may be determined. The pressure drop $\Delta p$ with the injection quantity $\Delta V$ is calculated with the hydraulic total volume Vtotal for the elasticity modulus E.

$$E = \Delta p * \frac{V total}{\Delta V}$$

This value is stored as E1. If the driver selects an operating point with a lower power, the process is repeated at the now lower pressure. The value E2 is stored. The difference between the two values is related to the difference in pressure. This therefore results in a difference in pressure without dimension:

$$DW = \frac{E1 - E2}{p1 - p2}$$

Given the pressure difference selected here of 2000 bar to 350 bar, a differentiation value of 12.5 is assumed. If the determined difference values are above 12.5, bio-fuel EN590 is detected, and if they are below 12.5 biodiesel is detected.

In a second method variant, the difference value is determined on the basis of various artificial operating points. In this context, the procedure adopted is basically as in the first method variant. However, the two required pressures are not approached within the scope of their natural operating points but rather the pressure is artificially set at the desired level specifically for the determination of the elasticity modulus. Therefore, for example in the case of a medium load, at which a medium pressure is normally adopted, a high-pressure is adopted once, and a low pressure adopted another time. The rest of the method remains the same.

In another method variant, while the internal combustion engine is operating, the elasticity modulus profile plotted against the pressure is determined and each pressure difference is assigned a difference value which is compared with a difference value determined in advance, for the differentiation of the fuels. The basic method also stays the same here, but at each injection (or every 10th injection or another selected interval) the elasticity modulus is calculated and stored. This results in an elasticity modulus profile plotted against pressure. Each pressure difference may then be assigned a difference value. And a difference value, which serves for the differentiation of the fuels, may be determined in advance for each pressure difference.

In all the method variants, all the values are determined so close in terms of time that an unchanged (fuel inflow) temperature (approximately ±10° C.) may be assumed.

The method according to the example embodiments is basically suitable for detecting fuel both in the case of gasoline fuels and in the case of diesel fuels.

BRIEF DESCRIPTION OF THE DRAWINGS

The invention will be explained in detail hereunder by means of an exemplary embodiment in conjunction with the drawing. The single FIGURE shows a diagram of determined difference values as a function of the temperature.

DETAILED DESCRIPTION

In this example embodiment, the procedure adopted is in accordance with the first method variant described above. During the operation of the internal combustion engine, a natural operating point with an injection pressure of 2000 bar is assumed. This pressure is measured. Since the injection quantity is known, the elasticity modulus may be calculated therefrom in the way described above, said elasticity modulus being stored as E1.

The procedure is repeated with respect to a further natural operating point which corresponds here to an injection pressure of 350 bar, and an elasticity modulus is determined which is stored as E2. A difference value with respect to the corresponding pressure difference is obtained therefrom and is to in relation to a selected differentiation value of 12.5. If the determined difference value is above 12.5, the fuel is detected as diesel fuel EN590. If it is below 12.5, the fuel used is biodiesel (B10).

In the single FIGURE the corresponding difference values are represented for a pressure difference of 2000 bar to 350 bar as a function of the temperature for biodiesel B10 and for diesel fuel EN590. It is apparent that it is readily possible to differentiate between the two fuels without requiring temperature information to do so.

The invention claimed is:

1. A method for operating an internal combustion engine with detection of the fuel used for injection, comprising:
   determining an elasticity modulus E1 of the fuel to be injected, at a first injection pressure p1;
   determining the elasticity modulus E2 of the fuel to be injected, at a second injection pressure p2;
   forming a difference between the two determined elasticity modulus values and relating the difference to a pressure difference in order to obtain a difference value DW according to the equation $$DW = \frac{E1 - E2}{p1 - p2};$$

defining a differentiation value for the difference value; and detecting a first type of fuel if the difference value is above the differentiation value, and a second type of fuel if the difference value is below the differentiation value.

2. The method as claimed in claim 1, wherein the first injection pressure and the second injection pressure are at least 1500 bar apart from one another.

3. The method as claimed in claim 1, wherein said method is carried out at a constant initial temperature.

4. The method as claimed in claim 1, wherein the method is carried out to differentiate between diesel fuel EN509 and biodiesel fuel.

5. The method as claimed in claim 1, wherein the difference value is determined during operation of the internal combustion engine, on the basis of a plurality of natural operating points.

6. The method as claimed in one of claim 1, characterized in that the difference value is determined on the basis of a plurality of artificial operating points.

7. The method as claimed in one of claim 1, further comprising, while the internal combustion engine is operating, determining an elasticity modulus profile plotted against pressure and each pressure difference is assigned a difference value which is compared with a difference value which is determined in advance, in order to differentiate between fuels.

8. The method as claimed in claim 1, wherein the first type of fuel is diesel fuel and the second type of fuel is biodiesel fuel.

9. A method for detecting a type of fuel used in operating an internal combustion engine of a vehicle, comprising:

determining an elasticity modulus value of the fuel to be injected into an internal combustion engine, at a first injection pressure;

determining the elasticity modulus value of the fuel to be injected, at a second injection pressure;

determining a difference value by dividing a difference between the determined elasticity modulus values by a difference between the first injection pressure and the second injection pressure; and detecting a first type of fuel if the difference value is above a differentiation value, and a second type of fuel if the difference value is below the differentiation value.

10. The method of claim 9, further comprising determining the differentiation value.

11. The method of claim 10, wherein determining the differentiation value comprises extracting the differentiation value from a plurality of stored differentiation values.

12. The method of claim 9, wherein the difference between the first injection pressure and the second injection pressure is at least 1500 bar.

13. The method of claim 9, wherein one of the first injection pressure and the second injection pressure is 2000 bar and the other of the first injection pressure and the second injection pressure is 350 bar.

14. The method of claim 9, wherein the first type of fuel is diesel fuel and the second type of fuel is biodiesel fuel.

15. The method of claim 9, wherein the first type of fuel is EN590 diesel fuel and the second type of fuel is biodiesel fuel.

16. The method of claim 9, wherein said method is carried out at a constant initial temperature.

* * * * *